May 27, 1941.  J. L. BIACH  2,243,188
LIQUID LEVEL CONTROL
Filed July 5, 1940  2 Sheets-Sheet 1
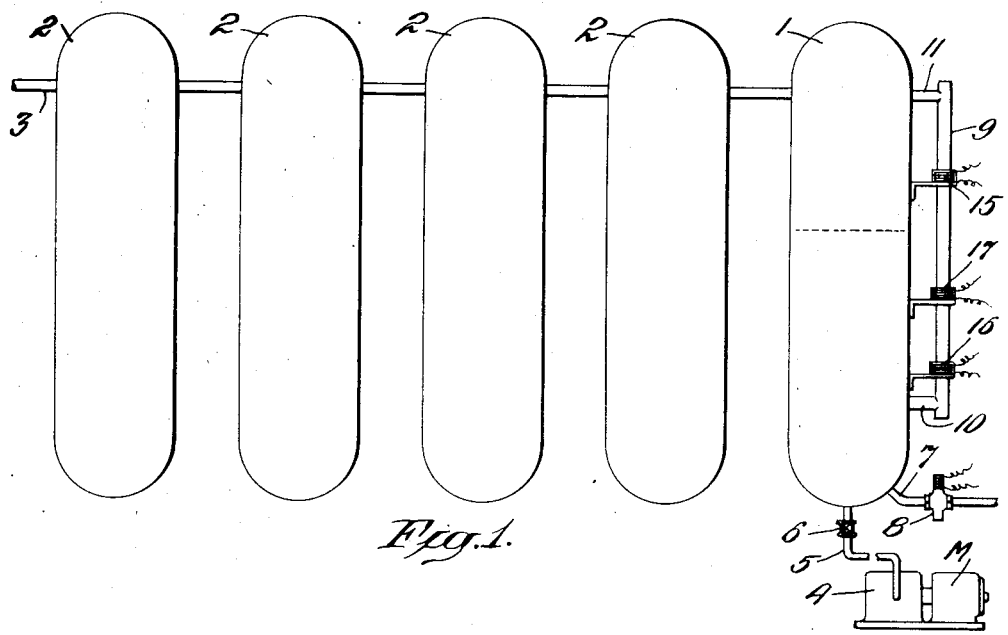
Fig. 1.
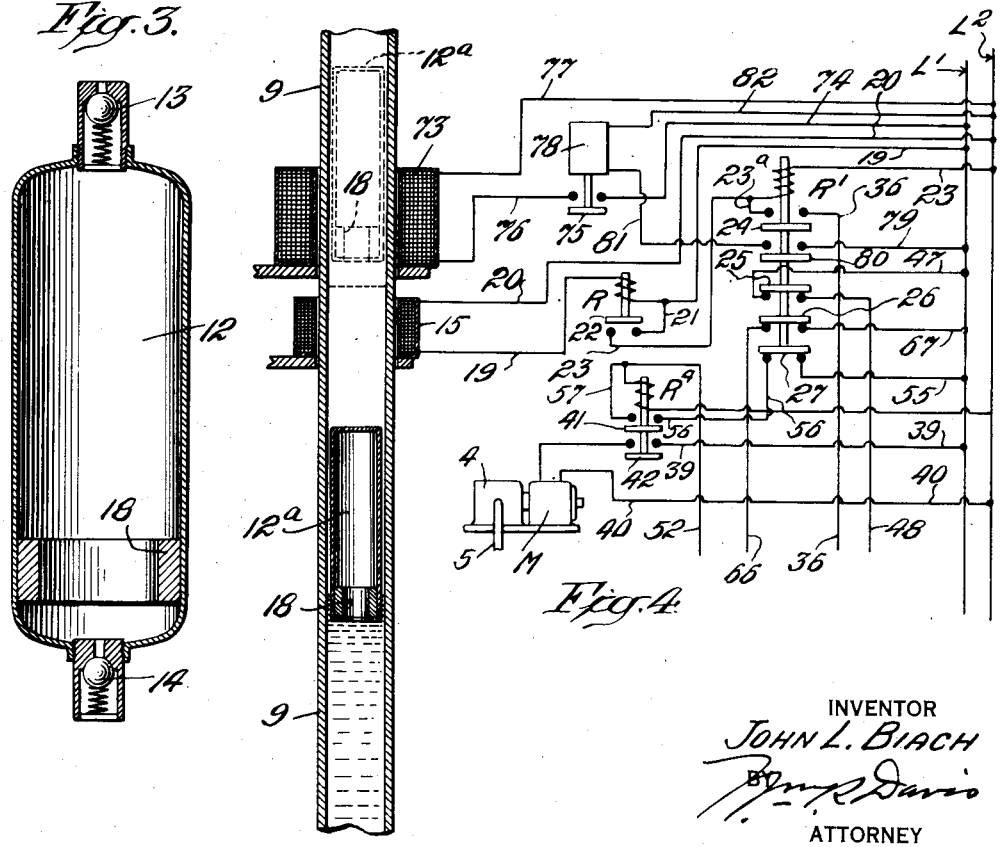
Fig. 3.
Fig. 4.
INVENTOR
JOHN L. BIACH
ATTORNEY May 27, 1941.  J. L. BIACH  2,243,188
LIQUID LEVEL CONTROL
Filed July 5, 1940  2 Sheets-Sheet 2
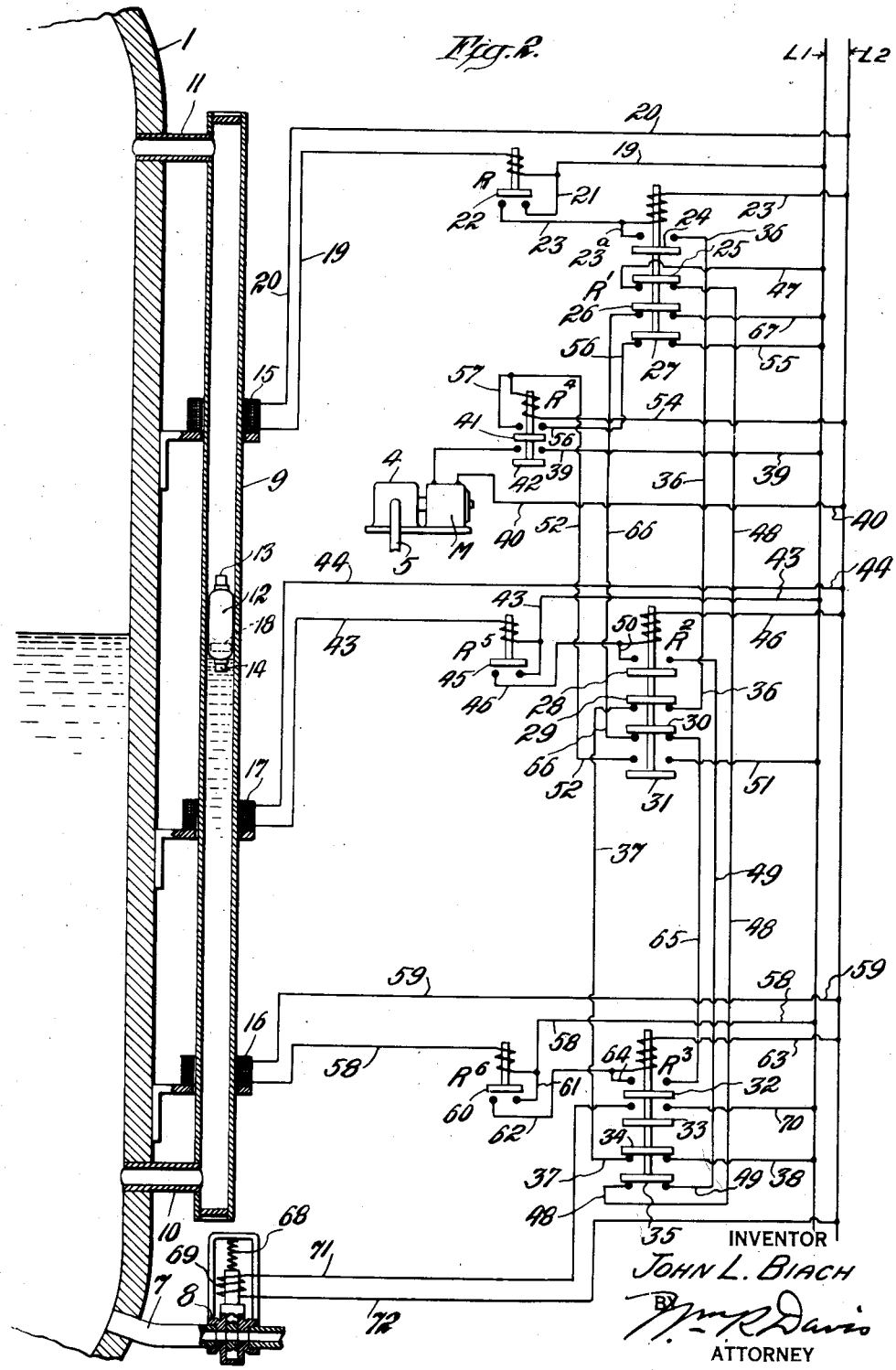
INVENTOR
JOHN L. BIACH
BY
ATTORNEY Patented May 27, 1941

2,243,188

UNITED STATES PATENT OFFICE 2,243,188

LIQUID LEVEL CONTROL

John L. Biach, Roselle, N. J., assignor to The Watson-Stillman Co., Roselle, N. J., a corporation of New Jersey Application July 5, 1940, Serial No 344,023

4 Claims. (Cl. 137—68)

Important objects of the present invention are to provide improved means for automatic control of the level of liquid in a container and, more particularly, for control of the charging of a hydraulic pressure accumulator with liquid against the resistance of compressed air in the accumulator; to provide simple and satisfactory electro-magnetic means for said purpose; to provide for control of liquid level in a container by electro-magnetic means wherein there is a float to rise and fall with the liquid level, an inductance coil is provided to create a magnetic field in the path of the float so that entrance of the float into the field will change inductance in the coil, and there is means responsive to the change of inductance to control charging of the container with the liquid; and to provide means to prevent crushing of a hollow float employed for said purpose by the fluid pressure in an accumulator.

Other objects of the invention will appear hereinafter.

In the drawings, Fig. 1 is a diagrammatic view of a hydro-pneumatic accumulator equipped with the said electro-magnetic level control means;

Fig. 2 is a vertical, sectional view of a portion of the accumulator and the control means and includes a diagrammatic illustration of an electrical system which is responsive to electro-magnetic means for controlling delivery of liquid from a pump to the accumulator and also for limiting discharge of liquid from the accumulator;

Fig. 3 is an enlarged vertical sectional view of the float comprising an element of the control means; and Fig. 4 is a vertical sectional view showing a modified form of the float, a portion of the tube containing the float, one of the inductance coils to coact with the float, a coil for raising the float to admit air to the interior thereof and a portion of the electrical system provided with means for controlling current in the latter coil.

The invention is illustrated as employed in connection with a hydro-pneumatic accumulator including a closed liquid tank 1 and a plurality of compressed air tanks 2. The latter are connected in series. An air tank at one end of the series has a pipe connection with the liquid tank near the upper end of the latter, and an air tank at the opposite end of the series has a pipe connection 3 with an air compressor not shown. A power-driven pump 4 has a delivery pipe connection 5 with the lower end of the tank 1 to supply the latter with water. Said pipe has a valve 6 operable to control delivery to the tank. A discharge pipe 7 leads from the tank. Pipe 7 has a valve 8 operable to stop discharge from the tank 1 when the liquid falls to a certain level in the tank.

Alongside of the liquid tank 1 there is a straight vertical tube 9 closed at its ends. Between the tank and the tube there are pipe connections 10 and 11. Pipe 10 is at a low level and charges the tube with the liquid to the same level as that within the tank. Pipe 11 is at a high level and charges the portion of the tube above the liquid level with air at the same pressure as the pressure in the tank 1. The tube is formed of non-magnetic material such as bronze, for example. Within the tube there is a hollow, metal airtight float 12. In the form shown in Figs. 2 and 3 the float is of tubular form and has closed ends. Its outside diameter is only a little less than the caliber of the tube so that the tube will hold the float substantially upright. In order to give the float sufficient buoyancy its walls are made thin and provision is made for balancing pressure within and without the float to prevent crushing thereof by the high pneumatic and hydraulic pressures. For that purpose the upper end of the float has an air inlet provided with a downwardly opening check valve 13 and the lower end of the float has an outlet also provided with a downwardly opening check valve 14. These check valves have light springs for holding them normally closed. Compressed air at the top of the float forces open the upper check valve and charges the interior of the float to approximately the same pressure as the pressure upon the outside of the float. Thereby crushing pressure upon the float is adequately resisted. If the pressure outside of the float should diminish to a point below the pressure trapped within the float by the check valve 13 the check valve 14 will be forced open to reduce the internal pressure and restore an approximate pressure balance. The air so forced from the float will carry with it moisture which may have condensed within the float and thus assist in maintaining the buoyancy of the float. The check valve 14 prevents admission of the liquid to the float.

At points spaced therealong the tube 9 is encircled by inductance coils. In the present instance there are three of these coils supported in fixed positions and including an upper coil 15, a lower coil 16 and an intermediate coil 17. Each coil is supplied with electric current and the coils create magnetic fields at different levels within the non-magnetic tube. For coaction with the coils the float 12 is provided with a ring 18 of highly permeable magnetic material such as a material containing iron and nickel, for example. In the present instance this ring is secured within the lower end portion of the float. When, by the rise and fall of the float, said ring is brought into the magnetic field of any one of the coils it changes the inductance in the coil. This change of inductance in the different coils is employed to control the charging of the liquid tank 1 and also control discharge from the tank through the pipe 7.

The coils 15, 16 and 17 are supplied with electrical current, preferably alternating, from line wires L' and L². Two conductors 19 and 20 connect the wires L' and L² respectively to the coil 15. In series with the conductor 19 there is the coil of a relay R. Said coil is located so that the ring 18 of the float does not enter its magnetic field until the liquid in the tank and tube approaches a desired maximum level. When the ring is below the effective magnetic field of coil 15 full current flows through the coil of relay R and holds the relay open. When, however, the ring enters the magnetic field it imposes a resistance in the circuit of coil 15 which causes the relay R to close and establish a circuit including line wire L', conductor 19, a conductor 21, contactor 22 of said relay, a conductor 23 and line wire L². The coil of a relay R' is in series with conductor 23. Relay R' has four contactors, 24, 25, 26 and 27. Operation of said relay by closure of relay contactor 22 causes shift of contactor 24 to circuit-closing position and shift of contactors 25, 26 and 27 to circuit-opening position. For cooperation with the relay R' there are two relays R² and R³. Relay R² has four contactors 28, 29, 30 and 31 and relay R³ has four contactors 32, 33, 34 and 35. When relay R' is operated, as just described, to close its contactor 24 there is established a sealing circuit for this relay including line wire L², conductor 23, a conductor 23ᵃ, contactor 24, a conductor 36, contactor 29 of relay R², a conductor 37, contactor 34 of relay R³, a conductor 38 and line wire L'. When the relay R' is so held it keeps the pump 4 idle.

The pump 4 is driven by an electric motor M. The operating circuit for said motor includes line wire L', a conductor 39, a conductor 40 and line wire L². Said circuit is opened and closed by a relay R⁴ having two contactors 41 and 42. Relay R⁴ is operated through relay R² to open and close the motor circuit. When the float descends, due to withdrawal of liquid from the tank 1, and the ring 18 enters the effective magnetic field of the coil 17 it causes starting of the pump to raise the liquid level in the tank. The circuit of coil 17 includes line wire L', a conductor 43, a conductor 44 and line wire L². In series with conductor 43 there is the coil of a relay R⁵ having a contactor 45. Entrance of ring 18 into the magnetic field of coil 17 imposes a resistance in the circuit of the coil and causes contactor 45 to drop and close a circuit for the coil of relay R². This circuit includes line wire L', conductor 43, contactor 45, a conductor 46, and line wire L². Thereby the contactors of relay R² are raised. Raising of contactor 29 breaks the holding circuit of relay R' and permits the contactors thereof to drop. Dropping of contactor 25 establishes for relay R² a holding circuit including line wire L', a conductor 47, contactor 25, a conductor 48, contactor 35 of relay R³, a conductor 49, contactor 28 of relay R², a conductor 50, conductor 46 and line wire L². At the same time, contactor 31 of relay R² closes the circuit of the pump motor by establishing a circuit through relay R⁴. This circuit includes line wire L', a conductor 51, contactor 31, a conductor 52, the winding of relay R⁴, a conductor 54 and line wire L². Thereby contactors 41 and 42 of relay R⁴ are raised. Contactor 42 closes the motor circuit and contactor 41 establishes for relay R⁴ a holding circuit including line wire L', a conductor 55, contactor 27 of relay R', a conductor 56, contactor 41, a conductor 57, conductor 54 and line wire L². Thereby the pump motor circuit is held closed by contactor 41 and the pump is operated until the ring 18 of the float enters the magnetic field of the upper coil 15. As previously described, that causes closure of the circuit for the relay R' and the contactors of said relays are raised. Raising of contactor 27 breaks the holding circuit for relay R⁴ so that the contactors of said relay drop and the circuit for the pump motor is opened.

If, for some reason, the liquid level in tank 1 should drop sufficiently to allow the ring 18 of the float to enter the magnetic field of the lower coil 16 the discharge valve 8 will be closed automatically to prevent further loss of liquid from the tank. The circuit for coil 16 includes line wire L', a conductor 58, a conductor 59 and line wire L². A relay R⁶ is in series with conductor 58 and has a contactor 60. Entrance of the ring 18 into the effective magnetic field of coil 16 imposes a resistance in the circuit of said coil and causes the contactor 60 to drop and establish a circuit for the winding of relay R³. This circuit includes line wire L', conductor 58, a conductor 61, contactor 60, a conductor 62, a conductor 63 and line wire L². Thereby the contactors of relay R³ are raised. Raising of contactor 32 establishes for relay R³ a holding circuit including line wire L², conductor 63, conductor 62, a conductor 64, contactor 32, a conductor 65, contactor 30 of relay R³, a conductor 66, contactor 26 of relay R', a conductor 67 and line wire L'. It will be understood that said contactors of relays R' and R² will be in their lower positions to make this holding circuit by reason of the fact that descent of the ring 18 into the field of coil 17 will have caused closing of the circuit of relay R² and consequent breaking of the holding circuit of relay R' and further descent of the ring 18 into the field of coil 16 will have caused operation of relay R³ to break the circuit of relay R².

The discharge valve 8 is normally held open by a spring 68. A solenoid 69 is provided for closing the valve. When the relay R³ is operated as just described it causes its contactor 33 to establish for the solenoid a circuit including line wire L', a conductor 70, contactor 33, a conductor 71, the winding of the solenoid, a conductor 72, and the line wire L². Thereby the solenoid will be operated to close the valve 8 and hold it closed as long as the holding circuit for the relay R³ remains closed. Subsequent rise of the ring 18 of the float into the magnetic field of the coil 17 will cause operation of the relay R² to break the holding circuit for relay R³. Thereupon the contactor 33 of the latter relay will drop and break the circuit of solenoid 69. Spring 68 will then close the valve 8.

In the modification of the invention shown in Fig. 4, the float 12ᵃ is of tubular form but is open at its lower end to admit compressed air to the interior of the float for balancing the pressure upon the outside of the float. Means are provided to admit air to the float each time it enters one of the inductance coils, preferably the upper coil 15. Directly above coil 15 a larger coil 73 encircles the float to create within the tube 9 a more powerful field capable of lifting the float entirely out of the liquid in the tube so that compressed air can enter the float each time that the float reaches a certain elevation in the tube. Thereby any loss of air from the float by absorption into the liquid is compensated for and the float is prevented from sinking.

The lifting coil 73 is supplied with current by a circuit including line wire L', a conductor 74, a switch 75, a conductor 76, a conductor 77 and line wire L². Switch 75 is controlled by a timer 78 which may be of any of several well-known types. There is provided for starting the timer a circuit including line wire L', a conductor 79, an additional contactor 80 provided in the relay R', a conductor 81, a conductor 82 and line wire L². When the contactors of relay R' are raised, as previously described, in response to entrance of the ring 18 of the float into the magnetic field of coil 15, raising of contactor 80 will close the circuit for starting the timer. The timer will then close switch 75 to supply the coil 73 with current for a brief period during which the magnetic field created by coil 73 will raise the float clear of the liquid. Then the timer will cause the switch 75 to shift and open the coil circuit. The float will then drop back to submerge its open lower end in the water. While a lifting coil is shown associated with only one of the three original coils there may, if desired, be a lifting coil associated with each of said three coils.

What I claim is:

1. In combination with a tank to contain liquid and means to supply said tank with liquid, the tank having a discharge connection, a vertical tube of non-magnetic material in communication with the tank to contain a column of said liquid for rise and fall of the level thereof along with the rise and fall of the liquid level in the tank, a float within the tube to rise and fall with the rise and fall of the level of the liquid of said column and having magnetic material in its structure, a plurality of inductance coils encircling said tube and supported at points spaced therealong and including an upper coil, a lower coil and an intermediate coil, each having electrical connections to supply it with current and all being arranged to dispose their magnetic fields at spaced levels within a predetermined range of rise and fall of said float, for change of inductance in any one of said coils by entry of the magnetic material of the float into the magnetic field of the coil, means responsive to such inductance change in the upper coil to stop delivery from said liquid supply means to the tank, means responsive to such inductance change in the intermediate coil to cause delivery from said supply means to the tank, and means responsive to such inductance change in the lower coil to prevent delivery from the tank through said discharge connection.

2. In combination with a tank to contain liquid and compressed air on the surface of the liquid and means to supply said tank with liquid, a vertical tube of non-magnetic material in communication with the tank to contain a column of said liquid with said compressed air thereon, for rise and fall of the liquid level of the column along with the rise and fall of the liquid level in the tank, a hollow float within the tube to rise and fall with the rise and fall of the level of the liquid of said column and having magnetic material in its structure, said float being open at its lower end for trapping air therein, for the purpose set forth, an inductance coil encircling the tube and supported at a point therealong to dispose its magnetic field within a predetermined range of rise and fall of the float and having connections to supply it with current, for change of inductance in said coil by entry of the magnetic material of the float into said field, means responsive to such inductance change to control delivery from said liquid supply means to the tank, and an inductance coil encircling the tube and supported at a point above said first coil and having connections to supply it with current, for action by the current in said second coil upon the magnetic material of the float to lift the float from the liquid in the tube for admission of air to the interior of the float.

3. In combination with a tank to contain liquid and compressed air on the surface of the liquid and means to supply said tank with liquid, a vertical tube of non-magnetic material in communication with the tank to contain a column of the liquid with said compressed air thereon for rise and fall of the liquid level of the column along with the rise and fall of the liquid level in the tank, a hollow float within the tube to rise and fall with the rise and fall of the level of the liquid of said column and having magnetic material in its structure, said float being open at its lower end for trapping air therein, for the purpose set forth, means responsive to arrival of the float at one position along the tube to control delivery from said liquid supply means to the tank, and an inductance coil encircling the tube and having connections to supply it with current, for action by the current in said second coil upon the magnetic material of the float to lift the float clear of the liquid in the tube for admission of air to the interior of the float.

4. A vertical tube of non-magnetic material to contain a column of liquid and contain compressed air on the surface of the liquid, a hollow float within the tube to rise and fall with the level of the liquid of said column and having magnetic material in its structure, said float being open at its lower end to trap air therein, for the purpose set forth, electrical circuit means, means operable by arrival of the float at a position along the tube to control current in said circuit means, and electrical means outside of the tube to create a magnetic field within the tube at a point along the latter to lift the float from the liquid when the magnetic material of the float enters said field, for admission of air to the interior of the float.

JOHN L. BIACH.